(12) United States Patent
Brack et al.

(10) Patent No.: US 6,525,163 B1
(45) Date of Patent: Feb. 25, 2003

(54) PROCESS FOR THE PRODUCTION OF POLYCARBONATE

(75) Inventors: Hans-Peter Brack, Etten-Leur (NL); Daniel Brunelle, Burnt Hills, NY (US); James A. Cella, Clifton Park, NY (US); Dennis Karlik, Bergen op Zoom (NL); Tomoaki Shimoda, Ichihara (JP); Akio Ikeda, Ichihara (JP); Takato Kimura, Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/948,253

(22) Filed: Sep. 7, 2001

(51) Int. Cl.⁷ .............................................. C08G 64/00
(52) U.S. Cl. ...................... 528/196; 528/198
(58) Field of Search .................. 528/196, 198

(56) References Cited

U.S. PATENT DOCUMENTS

| | | | |
|---|---|---|---|
| 4,520,074 A | 5/1985 | O'Donnell et al. | |
| 5,696,222 A | 12/1997 | Kaneko et al. | |
| 5,759,689 A | 6/1998 | Sieloff | |

FOREIGN PATENT DOCUMENTS

| | | |
|---|---|---|
| EP | 0 764 673 | 3/1997 |
| EP | 0 980 861 | 10/1998 |
| EP | 0 985 696 | 10/1999 |
| JP | 06145516 | 5/1994 |
| JP | H6-157739 | 6/1994 |
| JP | H7-90074 | 4/1995 |

*Primary Examiner*—Terressa M. Boykin
(74) *Attorney, Agent, or Firm*—Oppedahl & Larson LLP

(57) ABSTRACT

Polycarbonate having increased end-cap levels is made by adding an end-capping agent to the polycarbonate, preferably after the polycarbonate has reached a number-average molecular weight of about 2,000 to 15,000 Dalton. The end-capping agent has the formula:

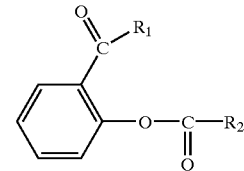

wherein $R_1$ is a phenyl, phenoxy, benzyl, or benzyloxy and $R_2$ is selected from the group consisting of $C_1$–$C_{30}$ alkyl, $C_1$–$C_{30}$ alkoxy, $C_6$–$C_{30}$ aryl, $C_6$–$C_{30}$ aryloxy, $C_7$–$C_{30}$ aralkyl, and $C_7$–$C_{30}$ aralkyloxy.

23 Claims, No Drawings

PROCESS FOR THE PRODUCTION OF POLYCARBONATE

FIELD OF THE INVENTION

The present invention relates to a process for the production of polycarbonate and to the use of carbonate and ester derivatives of phenyl and benzyl salicylates, 2-hydroxybenzophenone, and benzyl 2-hydroxyphenyl ketone as end-capping agents for polycarbonate.

BACKGROUND OF THE INVENTION

Polycarbonate is excellent in mechanical properties such as impact resistance and is also excellent in heat resistance and transparency, and it is widely used in many engineering applications. It is known that a high level of end-caps, i.e., wherein most of the terminal phenolic hydroxyl groups in the polycarbonate are terminated, helps to reduce static charging, improve heat aging, and lower water absorption of polycarbonate resins. Consequently, various coupling agents and end-capping agents have been tried to enhance the end-cap levels in the production of polycarbonate.

Unexamined Japanese Patent Application H6-157739 discloses the use of certain non-activated carbonates and esters, particularly diphenyl carbonate as the most preferred, as end-capping agents.

JP-A 7-90074 discloses a method of producing a polycarbonate from a dihydric compound and a carbonic acid diester by an ester exchange method, in which a highly active diester, acid halide or acid anhydride with at least two functional groups is added after the ester exchange ratio exceeds 70% to obtain a polycarbonate having an enhanced polymerization degree. It should be noted that JP-A 7-90074 teaches the use of di-activated molecules as coupling agents or polymerization promoters, and not end-capping agents.

U.S. Pat. No. 5,696,222 and EP 0 985 696 A1 disclose a method of producing a polycarbonate having a high-end cap levels by the addition of certain activated and di-activated carbonates as end-capping agents. It is disclosed that the end-capping agents are added to the process after the polycarbonate formed having an intrinsic viscosity of at least 0.3 dl/g, to form a polycarbonate with increased end-cap levels with minimal changes in molecular weight or intrinsic viscosity, i.e., having an intrinsic viscosity that is greater or smaller than the viscosity of the polycarbonate formed before the addition of the end-capping agents by at most 0.1 dl/g. It is also disclosed that these end-capping agents are activated by a phenolic group having an ortho chlorine atom, methoxycarbonyl or ethoxycarbonyl group, with 2-methoxycarbonylphenyl-phenylcarbonate and 2-methoxycarbonylphenyl-4'-cumylphenylcarbonate being preferred. The use of chlorinated phenols results in the production of potentially toxic byproducts or ones that produce gaseous products containing chlorine upon combustion. Thus, from handling and environmental considerations, there is a demand for the use of end-capping agents that are free from chlorine groups. These end-capping agents also yield volatile byproducts having melting points considerably lower than that of the usual byproduct of the polycarbonate melt transesterfication reaction (phenol), and thus they require special low temperature coolant liquids and complicated and energy consuming apparatuses consisting of low temperature condensation vessels and distillation units for effective removal of these byproducts from the molten polycarbonate and accurate and controlled vacuum level in the batch or continuous reaction system used to prepare the polycarbonate by the melt transesterfication method.

EP 0 980 861 A1 discloses the use of certain salicylic acid ester derivatives as an end-capping agent in amounts of 0.1 to 10 times, and most preferably 0.5 to 2 times, mole per mole equivalent of terminal hydroxyl groups of the polycarbonate formed at a time of the addition, for the production of a polycarbonate having good color tone suitable for optical material use. It is disclosed that these end-capping agents are activated by a phenolic group having an ortho methoxycarbonyl or ethoxycarbonyl group. It should be noted that the examples in EP 0 980 861 A1 teach the use of 2-methoxycarbonylphenyl-phenylcarbonate as an end-capping agent in an amount that is about 1 mole per mole equivalent of terminal hydroxyl groups to form a polycarbonate with increased end-cap levels.

There is still a need for an improved melt process using easy to handle end-capping agents that yield volatile byproducts having melting points similar to that of phenol to produce polycarbonate having capped terminals and controlled molecular weight build-up.

SUMMARY OF THE INVENTION

The invention relates to a process for the production of polycarbonate, the process comprising adding to a polycarbonate with free terminal hydroxy groups an end-capping agent of the formula:

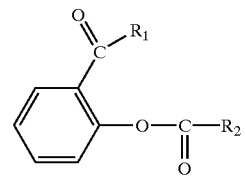

wherein $R_1$ is a phenyl, phenoxy, benzyl, or benzyloxy and $R_2$ is selected from the group consisting of $C_1$–$C_{30}$ alkyl, $C_1$–$C_{30}$ alkoxy, $C_6$–$C_{30}$ aryl, $C_7$–$C_{30}$ aralkyl, and $C_6$–$C_{30}$ aryloxy.

Specific examples of suitable R1 groups include but are not limited to phenoxy and benzyloxy. Specific examples of suitable R2 groups include but are not limited to stearyl, phenyl, para-t-butyl-phenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof. $R_2$ aryl, aralkyl, and aryloxy groups may also be substituted with a member selected from the group consisting of a $C_1$–$C_{24}$ alkyl, $C_1$–$C_{24}$ alkoxy, phenylcarbonyl, phenoxycarbonyl, benzylcarbonyl, benzyloxycarbonyl, 2-(phenylcarbonyl)phenyloxycarbonyl, 2-(phenoxycarbonyl)phenyloxycarbonyl, 2-(benzylcarbonyl)phenyloxycarbonyl, 2-(benzyloxycarbonyl)phenyloxycarbonyl, 2-(phenylcarbonyl)phenyloxycarbonyloxy, 2-(phenoxycarbonyl)phenyloxycarbonyloxy, 2-(benzylcarbonyl)phenyloxycarbonyloxy, and 2-(benzyloxycarbonyl)phenyloxycarbonyloxy groups.

DETAILED DESCRIPTION OF THE INVENTION

Applicants have surprisingly found in the process of the present invention that, by adding a relatively small amount of the low melting end-capping agents of the invention, the end-capping agent rapidly caps or blocks the terminal OH groups of the melt polycarbonate.

End-capping Agent/MW Builder

In the process of the present invention, a compound of the following formula is added to a polycarbonate oligomer as an end-capping agent and to control the molecular weight of the polycarbonate oligomer:

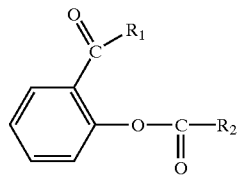

wherein $R_1$ is a phenyl, phenoxy, benzyl, or benzyloxy and $R_2$ is selected from the group consisting of $C_1$–$C_{30}$ alkyl, $C_1$–$C_{30}$ alkoxy, $C_6$–$C_{30}$ aryl, $C_7$–$C_{30}$ aralkyl, and $C_6$–$C_{30}$ aryloxy. Specific examples of suitable $R_1$ groups include but are not limited to phenoxy and benzyloxy. Specific examples of suitable $R_2$ groups include but are not limited to stearyl, phenyl, para-t-butyl-phenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof. $R_2$ aryl, aralkyl, and aryloxy groups may be substituted with a member selected from the group consisting of a $C_1$–$C_{24}$ alkyl, $C_1$–$C_{24}$ alkoxy, phenylcarbonyl, phenoxycarbonyl, benzylcarbonyl, benzyloxycarbonyl, 2-(phenylcarbonyl)phenyloxycarbonyl, 2-(phenoxycarbonyl)phenyloxycarbonyl, 2-(benzylcarbonyl)phenyloxycarbonyl, 2-(benzyloxycarbonyl)phenyloxycarbonyl, 2-(phenylcarbonyl)phenyloxycarbonyloxy, 2-(phenoxycarbonyl)phenyloxycarbonyloxy, 2-(benzylcarbonyl)phenyloxycarbonyloxy, and 2-(benzyloxycarbonyl)phenyloxycarbonyloxy group.

The end-capping agent used in the method of the invention may be based on derivatives of phenyl salicylate, benzyl salicylate, 2-hydroxybenzophenone, or benzyl 2-hydroxyphenyl ketone that yield by-products having melting points above 20° C. Thus, for example, phenylsalicyl phenyl carbonate, benzylsalicyl phenyl carbonate, or 2-benzoylphenyl phenyl carbonate may be used, to yield ortho-substituted by products namely benzyl salicylate or phenyl salicylate (melting points (mp) of 24 and 44–46°, respectively) or 2-hydroxybenzophenone (mp=37–39° C.).

Preparation of the End-capping Agent

The end-capping agent used in the invention may be prepared by the reaction of appropriate chloroformates (e.g., phenyl chloroformate or p-cumylphenyl chloroformate) with one equivalent of an activated phenol, such as phenyl salicylate, in a solvent such as methylene chloride and in the presence of a base to neutralize the liberated HCl. Additional catalysts may be employed in this reaction to facilitate the condensation reaction. After completion of the condensation reaction, the product solution is washed with aqueous acid and base then with water until the washings are neutral. The organic solvent may be removed by distillation and the end-capping agent is crystallized or distilled and recovered.

The condensation reaction to prepare the end-capping agent of the present invention may be carried out under anhydrous conditions known in the art using one or more equivalents of a tertiary amine per equivalent of chloroformate as the base, or under interfacial conditions also well-known in the art using aqueous sodium hydroxide as the base in the presence of a condensation catalyst such as triethyl amine, quaternary alkyl ammonium salts, or mixtures thereof.

Terminal Blocking Reaction in the Polycarbonate Production Process

The end-capping agent is used in the present invention to rapidly cap or block the terminal hydroxy group (∼OH) of the polycarbonate to block the terminal of the polycarbonate as shown below:

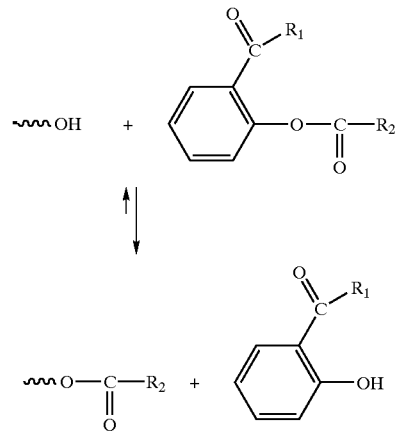

The ortho-substituted phenols generated in the reaction of the formula shown below are less reactive than phenol in backbiting reactions, which lead to molecular weight degradation of the polycarbonate. In addition, the ortho-substituted phenols have melting points that are above 20° C. and similar to that of phenol. Therefore, the by-product phenols are removed from the terminal-blocked polycarbonate by distillation to the over-head system using conventional means (i.e., freeze traps using chilled water as a coolant) where they can be condensed to expedite the terminal blocking at high yields. In one embodiment of the invention, the ortho-substituted phenol by-product of the following formula is recovered from the overhead system and reused to prepare new end-capping agents or terminating agents.

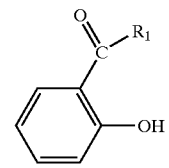

It should be noted that the terminal-blocked polycarbonate may still contain small amounts of any unrecovered phenols, any unreacted end-capping agent along with by-products of any side reactions to the terminal blocking reactions, e.g. terminal 2-(phenylcarbonyl)phenyl, 2-(phenoxycarbonyl)phenyl, or 2-(benzyloxycarbonyl)phenyl groups and the like. Specific embodiments of the invention operate to achieve specific maximum levels of these materials.

For example, the method of the invention may produce terminal-blocked polycarbonate that contains less than about 500 ppm, and even less than 100 ppm, of ortho-substituted phenols. In general, lower levels of these materials are desired. Low residuals of the ortho-substituted by-products are achieved through optimization of reactor and process design to maximize by-product removal after formation. In the case of the reactor, low residual levels can be facilitated by carrying out the end-capping reaction in or before a polymerizer (kneading-type reactor capable of generating a high surface area) in a continuous reaction system (CRS). Low pressures, typically less than 2 mbar, are maintained in batch reactors or the polymerizer of a CRS. In addition, heating the lines of any overhead devolatization system of a batch reactor or CRS, typically from 60–100° C., helps prevent premature condensation or solidification before removal of the ortho-substituted phenol by-products. Process considerations to achieve this result include sufficient residence time (typically 5 to 30 minutes) in the reactor for devolatization after end-capping to occur. Elevated temperatures in the batch reactor/polymerizer (typically 280–320° C.) also facilitate devolatization.

The method of the invention may be used to produce polycarbonates that contain less than about 500 ppm, and even less than 100 ppm, of unreacted end-capping agent. Low residual levels of end-capping agents are achieved through reactor and process design considerations similar to those discussed above for achieving low residual levels of ortho-substituted phenol by-products. In addition, optimizing the stoichiometry of end-capping agent to free OH helps ensure that there is not a great excess of end-capping agent added, and thus not too much unreacted end-capping agent to be devolatized. Typical stoichometries utilize 1.5 mole or less per mole of free OH groups. Making sure that there are sufficient levels of residual catalyst in the polycarbonate to be end-capped also helps limit the amount of residual end-capping agent. Typically, catalyst levels of about $10^{-4}$ to $10^{-8}$ mol catalyst/mol of BPA are suitable. Thus, it is appropriate to add the end-capping agent to unquenched polycarbonate. Supplemental catalyst may be employed if residual catalyst levels are determined to be insufficient, or for end-capping of previously quenched polycarbonate.

The terminal-blocked polycarbonate product may contain terminal 2-(phenylcarbonyl)phenyl, 2-(phenoxycarbonyl)phenyl, or 2-(benzyloxycarbonyl)phenyl groups which can be characterized as activated end groups. It is desirable to limit the introduction of such end groups, for example to levels of about 2,500 ppm or less. The introduction of these activated end groups occurs as a result of reaction of the non-activated side of the asymmetric activated carbonate end-capping agent. This reaction is controlled primarily by the much more favorable equilibrium (approx 300x) for reaction of the "activated" desired side versus non-activated "wrong" side. Sufficient residence time in the reactor (typically about 5 to 30 minutes) should be maintained to allow equilibration to occur.

Melt Polycarbonate Process

The process of the present invention is a melt or transesterification process. The production of polycarbonates by transesterification is well-known in the art and described, for example, in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905.

In the melt process, polycarbonate is produced by the melt polycondensation of aromatic dihydroxy compounds (A) and carbonic acid diesters (B). The reaction can be carried out by either a batch mode or a continuous mode. The apparatus in which the reaction is carried out can be any suitable type of tank, tube, or column. The continuous processes usually involve the use of one or more CSTR's and one or more finishing reactors.

Examples of the aromatic dihydroxy compounds (A) include bis(hydroxyaryl)alkanes such as bis(4-hydroxyphenyl)methane; 1,1-bis(4-hydroxyphenyl)ethane; 2,2-bis(4-hydroxyphenyl)propane (also known as bisphenol A); 2,2-bis(4-hydroxyphenyl)butane; 2,2-bis(4-hydroxyphenyl)octane; bis(4-hydroxyphenyl)phenylmethane; 2,2-bis(4-hydroxy-1-methylphenyl)propane; 1,1-bis(4-hydroxy-t-butylphenyl)propane; and 2,2-bis(4-hydroxy-3-bromophenyl)propane; bis(hydroxyaryl)cycloalkanes such as 1,1-(4-hydroxyphenyl)cyclopentane and 1,1-bis(4-hydroxyphenyl)cyclohexane; dihydroxyaryl ethers such as 4,4'-dihydroxydiphenyl ether and 4,4'dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. In one embodiment, the aromatic dihydroxy compound is bisphenol A (BPA).

Examples of the carbonic acid diesters (B) include diphenyl carbonate; ditolyl carbonate; bis(chlorophenyl) carbonate; m-cresyl carbonate; dinaphthyl carbonate; bis (diphenyl)carbonate; diethyl carbonate; dimethyl carbonate; dibutyl carbonate; and dicyclohexyl carbonate. In one embodiment of an industrial process, diphenyl carbonate (DPC) is used.

The carbonic diester component may also contain a minor amount, e.g., up to about 50 mole % of a dicarboxylic acid or its ester, such as terephthalic acid or diphenyl isophthalate, to prepare polyesterpolycarbonates.

In preparing the polycarbonates, usually about 1.0 mole to about 1.30 moles of carbonic diester are utilized for every 1 mole of the aromatic dihydroxy compound. In one embodiment, about 1.01 moles to about 1.20 moles of the carbonic diester is utilized.

Optional Terminators/End-capping Agents

In one embodiment of the process of the invention, additional/optional terminators or end-capping agents of the prior art may also be used. Examples of terminators include phenol, p-tert-butylphenol, p-cumylphenol, octylphenol, nonylphenol and other endcapping agents well-known in the art.

Optional Branching Agents

In one embodiment of the process of the present invention, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol, trimesic acid and benzophenone tetracarboxylic acid.

Optional Coupling Agent

In one embodiment of the process of the present invention, a coupling agent such as a bis-alkylsalicyl carbonate, e.g., bis-methyl or ethyl or propyl salicyl carbonate, bis-phenyl or benzyl salicyl carbonate, bis(2-benzoylphenyl)carbonate, BPA-bis-2-alkoxyphenylcarbonate, BPA-bis-2-aryloxyphenylcarbonate, or BPA-bis-2-benzoylphenylcarbonate is used in conjunction with the end-capping agent in order to obtain a faster and/or greater build in molecular weight in the polycarbonate oligomer.

Optional catalysts

The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

In one embodiment of the invention, the transesterification catalyst is a quaternary ammonium compound or a quaternary phosphonium compound. Non-limiting examples of these compounds include tetramethyl ammonium hydroxide, tetramethyl ammonium acetate, tetramethyl ammonium fluoride, tetramethyl ammonium tetraphenyl borate, tetraphenyl phosphonium fluoride, tetraphenyl phosphonium tetraphenyl borate, tetrabutyl phosphonium hydroxide, and dimethyl diphenyl ammonium hydroxide.

The above-mentioned catalysts may each be used by themselves, or, depending on the intended use, two or more types may be used in combination. When more than one catalyst is employed, each may be incorporated into the melt at a different stage of the reaction. In one embodiment of the invention, a portion of the catalyst is added together with the end-capping agent.

The appropriate level of catalyst will depend in part on how many catalysts are being employed, e.g., one or two. In general, the total amount of catalyst is usually in the range of about $1 \times 10^{-8}$ to about 1.0 mole per mole of the dihydroxy compound. In one embodiment, the level is in the range of about $1 \times 10^{-5}$ to about $5 \times 10^{-2}$ mole per mole of dihydroxy compound. When more than one catalyst is employed, each may be incorporated into the melt at a different stage of the reaction.

Other Optional Components in the Polycarbonate

In the present invention, the polycarbonate obtained may further contain at least one of a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

Adding the End-capping Agent to the Melt Process

The method of adding the end-capping agent to polycarbonate is not specially limited. For example, the end-capping agent may be added to the polycarbonate as a reaction product in a batch reactor or a continuous reactor system. In one embodiment, the end-capping agent is added to the melt polycarbonate just before or after a later reactor, i.e., a polymerizer, in a continuous reactor system. In a second embodiment, the end-capping agent is added by reactive extrusion after the last polymerizer in the continuous reactor system. In a third embodiment, it is added between the $1^{st}$ and $2^{nd}$ polymerizer in a continuous reactor system. In yet another embodiment, the end-capping agent is added between the $2^{nd}$ reactor and the $1^{st}$ polymerizer.

The end-capping agent is added in an amount sufficient to achieve a desired degree of end-capping. For example, end-capping agent may be added at a stoichiometry of about between 0.3 and 2.0 relative to the free OH content of the polycarbonate oligomer to which it is added. In one embodiment, it is added at a stoichiometry of about 0.5 to 1.5. In another embodiment, it is added at a stoichiometry of about 0.8 to 1.3 relative to the free OH that would be obtained in the final targeted molecular weight of the polycarbonate when no other end-capping agent is used.

The apparatus/method for feeding the end-capping agent is not specially limited. The end-capping agent may be added in the form of a solid, a liquid, a melt or a solution thereof. Further, the end-capping agent may be added in a predetermined amount once, or it may be separated into predetermined amounts and added several times. In one embodiment, it is added to the process as a powder or liquid by means of a static mixer.

The end-capping agent is suitably added after the polymerization has proceeded to some extent to at least partially form polycarbonate oligomers. In particular, the end-capping agent is suitably added after polymerization has proceeded to an extent that the number average molecular weight Mn has reached at least about 2,000 Daltons. In a particular embodiment of the invention, the end-capping agent is added when the number average molecular weight is in the range of from about 2,000 Daltons to 15,000 Daltons.

In embodiments wherein end-capping agents yielding ortho-substituted phenols having melting points greater than 20° C. are used, it is not necessary to require special cooling liquids with temperatures below 0° C. or condensers or freeze traps maintained at temperatures below 0° C. for the end-capping agent addition system since the ortho-substituted phenols are readily removed by distillation to the over-head system using conventional means (i.e., freeze traps using chilled water as a coolant) where they can be condensed and solidified to expedite the terminal blocking at high yields.

The process of the present invention can be used to form polycarbonate that has a content of ortho-substituted phenols of less than about 500 ppm, a content of unreacted end-capping agent of less than about 500 ppm, and a content of activated end groups of less than about 2,500 ppm.

EXAMPLES

The present invention will be explained hereinafter with reference to Examples, while the present invention shall not be limited by Examples.

Starting Material Polycarbonate

In all examples, either starting polycarbonate grade A, B or C was used. The starting materials were prepared by a melt process in a continuous reactor system with the following properties:

|  | Polycarbonate A | Polycarbonate B | Polycarbonate C |
|---|---|---|---|
| Weight-average molecular weight Mw: | $18.3 * 10^3$ g/mole | ND | $4.44 * 10^3$ g/mole |
| Number-average molecular weight Mn: | $8.34 * 10^3$ g/mole | $8.67 * 10^3$ g/mole | $2.41 * 10^3$ g/mole |
| Free OH content: | 670 ppm | 745 ppm | 7345 ppm |
| End-cap ratio | 83.6% | 81.0% | 48% |

ND = Not Determined

In the Examples, the following measurements were made.

a) Molecular weight: Mw and Mn were measured by GPC analysis of 1 mg/ml polymer solutions in methylene chloride versus polystyrene standards. The measured polycarbonate Mw and Mn values were then corrected for the difference in retention volume between polycarbonate and polystyrene standards. In some cases Mn was measured by NMR spectroscopy.

b) Free-OH content was measured by UV/Visible analysis of the complexes formed from the polymer with $TiCl_4$ in methylene chloride solution. In some cases the Free OH content was measured by a direct UV method or by NMR spectroscopy.

c) End-cap levels were calculated from the free OH content and Mn values.

Examples 1–3

A batch reactor tube was charged under nitrogen with 25 g of polycarbonate A and $1.084 \times 10^{-3}$ mole of either end-capping agent Phenyl Salicyl Phenyl Carbonate (0.3624 g of "PSPC"—Example 1) or end-capping agent Benzyl Salicyl Phenyl Carbonate (0.3775 g of "BSPC"—Example 2) or end-capping agent 2-Benzoylphenyl Phenyl Carbonate (0.3127 g of "2-BPPC"—Example 3) of formulae (1), (2), and (3). The mixture was heated to a temperature of 300° C. and stirred for 20 minutes. After the melt mixing, stage vacuum was applied to the system to a pressure of 0.5 mbar and the reaction continued for 20 minutes. After the reaction stage, the colorless polymer was sampled from the reaction tube. The results are shown in table 1.

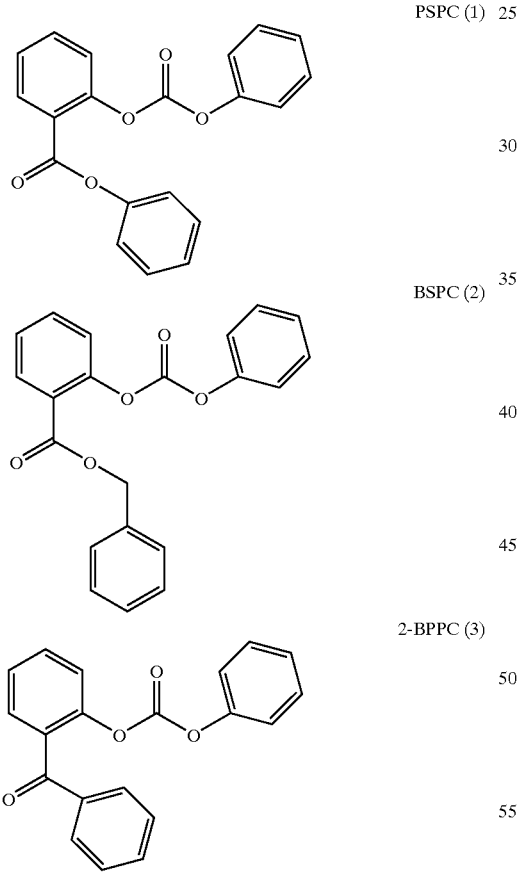

PSPC (1)

BSPC (2)

2-BPPC (3)

Comparative Examples 1–5

Example 1 was repeated but either no end-capping agent was used, or various other end-capping agents of the following formulae were used instead. The polymer obtained using 2-acetophenyl phenyl carbonate as endcapper was yellow in color. The results are also shown in table 1.

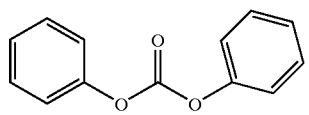

Diphenyl Carbonate

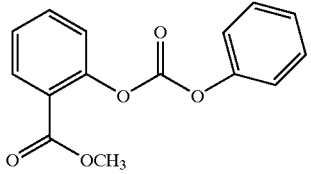

Methyl Salicyl Phenyl Carbonate

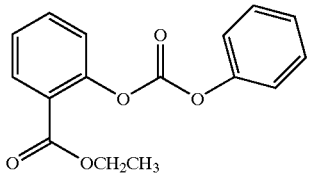

Ethyl Salicyl Phenyl Carbonate

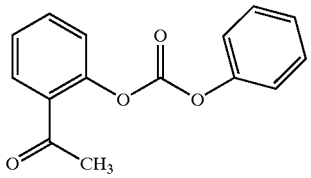

2-Acetophenyl Phenyl Carbonate

Examples 4

The same conditions were used as in examples 1–3 except that 127 g Polycarbonate B was used instead of A and that 2.330 g ($6.970 \times 10^{-3}$ mole) of Phenyl Salicyl Phenyl Carbonate (PSPC) was used as an end-capping agent. The results are also shown in table 1.

Examples 5

The same conditions were used as in example 4 except that 2.647 g ($7.920 \times 10^{-3}$ mole) of Phenyl Salicyl Phenyl Carbonate (PSPC) was used as an end-capping agent and a reaction temperature of 315° C. was used instead of 300° C. The results are also shown in table 1.

Examples 6

The same conditions were used as in example 4 except that 4.236 g ($12.67 \times 10^{-3}$ mole) of Phenyl Salicyl Phenyl Carbonate (PSPC) was used as an end-capping agent, a reaction temperature of 330° C. was used instead of 300° C., and a reaction time of 30 min. was used instead of 20 min. The results are also shown in table 1.

Comparative Examples 6–7

Example 4 was repeated except that 1.493 g ($6.970 \times 10^{-3}$ mole) of Diphenyl Carbonate was used as an end-capping agent for comparative example 6, and 1.898 g ($6.970 \times 10^{-3}$ mole) of Methyl Salicyl Phenyl Carbonate was used as an end-capping agent for comparative example 7. The results are in table 1.

Example 7

In this example, a continuous reaction system was used. The apparatus consists of one monomer mix agitation tank, two pre-polymerization tanks and one horizontally agitated polymerization tank. Bisphenol A and diphenyl carbonate in a molar ratio of 1.08:1 were continuously supplied to a heated agitation tank where a uniform solution was produced. About 250 eq ($2.5*10^{-4}$ mol/mol bisphenol A) tetramethylammonium hydroxide and 1 eq ($1.10^{-6}$ mol/mol bisphenol A) of NaOH were added to the solution as catalysts in the first pre-polymerization tank. The solution was then successively supplied to the next pre-polymerization tank and the horizontally agitated polymerization tank, arranged in sequence, and the polycondensation was allowed to proceed to produce a starting polymer "C" emerging from the outlet stream of the second pre-polymerization tank for Example 7 with a Mw of 4439±289 g/mol, an Mn of 2407±121 g/mol, and an endcap level of about 48%.

For example 7, Phenyl Salicyl Phenyl Carbonate (PSPC) was added by means of a heated static mixer to the molten polymer outlet stream of the pre-polymerization tanks (inlet stream of the horizontally agitated polymerization tank) in an amount of 2.39 mass % relative to the molten polymer stream.

Comparative Example 8

A repeat of Example 7 except that no end-capping agent was used.

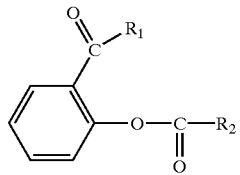

wherein $R_1$ is a phenyl, phenoxy, benzyl, or benzyloxy and $R_2$ is selected from the group consisting of $C_1$–$C_{30}$ alkyl, $C_1$–$C_{30}$ alkoxy, $C_6$–$C_{30}$ aryl, $C_6$–$C_{30}$ aryloxy, $C_7$–$C_{30}$ aralkyl, and $C_7$–$C_{30}$ aralkyloxy.

2. The process of claim 1, wherein $R_2$ aryl, aralkyl, or aryloxy group is substituted with a member selected from the group consisting of $C_1$–$C_{24}$ alkyl, $C_1$–$C_{24}$ alkoxy, phenylcarbonyl, phenoxycarbonyl, benzylcarbonyl, benzyloxycarbonyl, 2-(phenylcarbonyl)phenyloxycarbonyl, 2-(phenoxycarbonyl)-phenyloxycarbonyl, 2-(benzylcarbonyl)phenyloxycarbonyl, 2-(benzyloxycarbonyl)-phenyloxycarbonyl, 2-(phenylcarbonyl)phenyloxycarbonyloxy, 2-(phenoxycarbonyl)-phenyloxycarbonyloxy, 2-(benzylcarbonyl)phenyloxycarbonyloxy, and 2-(benzyloxycarbonyl)phenyloxycarbonyloxy group or mixtures thereof.

3. The process of claim 1, wherein $R_1$ is phenoxy or benzyloxy.

TABLE 1

| Example | Starting Material | End-capping agent/Blocking Agent Used | Amount mole/—OH | Reaction time min. | Reaction Temp. °C. | Mw g/mole | Mn g/mole | End-cap % |
|---|---|---|---|---|---|---|---|---|
| Starting Material | A | — | — | — | — | 18.3 E+03 | 8.34 E+03 | 83.6 |
| Starting Material | B | — | — | — | — | ND | 8.67 E+03 | 81.0 |
| Starting Material | C | — | — | — | — | 4.6 E+03 | 2.5 E+03 | 47.6 |
| 1 | A | Phenyl Salicyl Phenyl Carbonate | 1.1 | 20 | 300 | 17.2 E+03 | 7.6 E+03 | 92.0 |
| 2 | A | Benzyl Salicyl Phenyl Carbonate | 1.1 | 20 | 300 | 18.1 E+03 | 8.1 E+03 | 91.4 |
| 3 | A | 2-Benzoylphenyl Phenyl Carbonate | 1.1 | 20 | 300 | 19.7 E+03 | 8.2 E+03 | 93.9 |
| Comp. 1 | A | — | — | 20 | 300 | 21.0 E+03 | 11.7 E+03 | 85.1 |
| Comp. 2 | A | Diphenyl Carbonate | 1.1 | 20 | 300 | 21.1 E+03 | 11.7 E+03 | 88.1 |
| Comp. 3 | A | Methyl Salicyl Phenyl Carbonate | 1.1 | 20 | 300 | 19.6 E+03 | 10.6 E+03 | 90.2 |
| Comp. 4 | A | Ethyl Salicyl Phenyl Carbonate | 1.1 | 20 | 300 | 18.9 E+03 | 8.3 E+03 | 89.7 |
| Comp. 5 | A | 2-Acetophenyl Phenyl Carbonate | 1.1 | 20 | 300 | 18.4 E+03 | 8.3 E+03 | 85.9 |
| 4 | B | Phenyl Salicyl Phenyl Carbonate | 1.1 | 20 | 300 | ND | 7.90 E+03 | 92.3 |
| 5 | B | Phenyl Salicyl Phenyl Carbonate | 1.25 | 20 | 315 | ND | 8.40 E+03 | 93.9 |
| 6 | B | Phenyl Salicyl Phenyl Carbonate | 2.0 | 30 | 330 | ND | 8.31 E+03 | 97.7 |
| Comp. 6 | B | Diphenyl Carbonate | — | 20 | 300 | ND | 9.42 E+03 | 83.5 |
| Comp. 7 | B | Methyl Salicyl Phenyl Carbonate | 1.1 | 20 | 300 | ND | 9.96 E+03 | 91.5 |
| 7 | C | Phenyl Salicyl Phenyl Carbonate | — | 90 | 290 | 14.5 E+03 | 6.24 E+03 | 65.5 |
| Comp. 8 | C | — | — | 90 | 290 | 16.2 E+03 | 7.32 E+03 | 45.8 |

ND = Not Determined

What is claimed is:

1. A process for the production of an aromatic polycarbonate, comprising the steps of:

(a) preparing a polycarbonate having free terminal OH groups by a melt transesterification process from an aromatic dihydroxy compound and a carbonic acid diester;

(b) adding to the polycarbonate having free terminal OH groups, a sufficient amount of an end-capping agent of the following formula for capping the free terminal —OH groups of the polycarbonate, thereby forming a polycarbonate with an increased level of capped or blocked hydroxy groups:

4. The process of claim 1, wherein $R_2$ is selected from the group consisting of stearyl, phenyl, para-t-butyl-phenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof.

5. The process of claim 1, wherein the end-capping agent is added in an amount of about 0.1 to 1.5 mole based on 1 mole equivalent of the free terminal —OH groups of the polycarbonate at the time of the addition.

6. The process according to claim 5, wherein the end-capping agent is added in an amount of about 0.8 to 1.3 mole equivalent per mole of the free terminal —OH groups of the polycarbonate at the time of the addition.

7. The process according to claim 1, further comprising the step of adding to the polycarbonate under melt conditions a coupling agent selected from the group consisting of: bis-alkylsalicyl carbonate, bis-phenylsalicylcarbonate, bis-benzylsalicylcarbonate, bis(2-benzoylphenyl)carbonate, BPA-bis-2-alkoxycarbonylphenylcarbonate, BPA-bis-2-phenoxycarbonylphenylcarbonate, BPA-bis-2-benzyloxycarbonylphenylcarbonate, BPA-bis-2-benzoylphenylcarbonate and mixtures thereof.

8. The process according to claim 1, wherein the formed polycarbonate has a content of ortho-substituted phenols generated in the terminal blocking reaction of 500 ppm or below.

9. The process according to claim 1, wherein the formed polycarbonate has a content of ortho-substituted phenols generated in the terminal blocking reaction of 100 ppm or below.

10. The process according to claim 1, wherein the formed polycarbonate has a content of end-capping agent of 500 ppm or below.

11. The process according to claim 1, wherein the formed polycarbonate has a content of end-capping agent of 100 ppm or below.

12. The process according to claim 1, wherein the formed polycarbonate has a content of terminal 2-(alkoxycarbonyl)phenyl, 2-(phenoxycarbonyl)phenyl, 2-(benzyloxycarbonyl)phenyl, and 2-benzoylphenyl groups of 2,500 ppm or below.

13. The process according to claim 1, wherein the formed polycarbonate has a content of terminal 2-(phenoxycarbonyl)phenyl groups of 1,000 ppm or below.

14. The process according to claim 1, wherein the formed polycarbonate has a content of terminal 2-(benzyloxycarbonyl)phenyl groups of 1,000 ppm or below.

15. The process according to claim 1, wherein the end-capping agent is selected such that ortho-substituted phenols generated in the terminal blocking reaction have melting points above about 20° C.

16. The process according to claim 1, wherein the polycarbonate to which the end-capping agent is added has a number average molecular weight Mn of at least 2,000 Daltons.

17. The process according to claim 16, wherein the polycarbonate to which the end-capping agent is added has a number average molecular weight Mn of between 2,000 and 15,000 Daltons.

18. A process for terminating free hydroxyl groups in an aromatic polycarbonate having free hydroxyl groups, comprising the step of adding to the aromatic polycarbonate an end-capping agent of the following formula for capping the free terminal —OH groups of the polycarbonate, thereby forming a polycarbonate with an increased level of capped or blocked hydroxy groups:

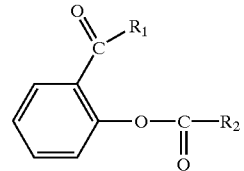

wherein $R_1$ is a phenyl, phenoxy, benzyl, or benzyloxy and $R_2$ is selected from the group consisting of $C_1$–$C_{30}$ alkyl, $C_1$–$C_{30}$ alkoxy, $C_6$–$C_{30}$ aryl, $C_6$–$C_{30}$ aryloxy, $C_7$–$C_{30}$ aralkyl, and $C_7$–$C_{30}$ aralkyloxy.

19. The process of claim 18, wherein $R_2$ aryl, aralkyl, and aryloxy group is substituted with a member selected from the group consisting of $C_1$–$C_{24}$ alkyl, $C_1$–$C_{24}$ alkoxy, phenylcarbonyl, phenoxycarbonyl, benzylcarbonyl, benzyloxycarbonyl, 2-(phenylcarbonyl)phenyloxycarbonyl, 2-(phenoxycarbonyl)phenyloxycarbonyl, 2-(benzylcarbonyl)phenyloxycarbonyl, 2-(benzyloxycarbonyl)phenyloxycarbonyl, 2-(phenylcarbonyl)phenyloxycarbonyloxy, 2-(phenoxycarbonyl)phenyloxycarbonyloxy, 2-(benzylcarbonyl)phenyloxycarbonyloxy, and 2-(benzyloxycarbonyl)phenyloxycarbonyloxy group or mixtures thereof.

20. The process of claim 18, wherein $R_1$ is phenoxy or benzyloxy.

21. The process of claim 18, wherein $R_2$ is selected from the group consisting of stearyl, phenyl, para-t-butyl-phenyl, phenoxy, para-tert-butylphenoxy, para-octylphenoxy, para-nonylphenoxy, para-dodecylphenoxy, 3-pentadecylphenoxy, para-octadecylphenoxy, para-cumylphenoxy, or mixtures thereof.

22. The process according to claim 18, wherein the end-capping agent is added in an amount of about 0.1 to 1.5 mole based on 1 mole equivalent of the free terminal —OH groups of the polycarbonate at the time of the addition.

23. The process according to claim 18, wherein the end-capping agent is added in an amount of about 0.8 to 1.3 mole equivalent per mole of the free terminal —OH groups of the polycarbonate at the time of the addition.

* * * * *